United States Patent Office 2,795,534
Patented June 11, 1957

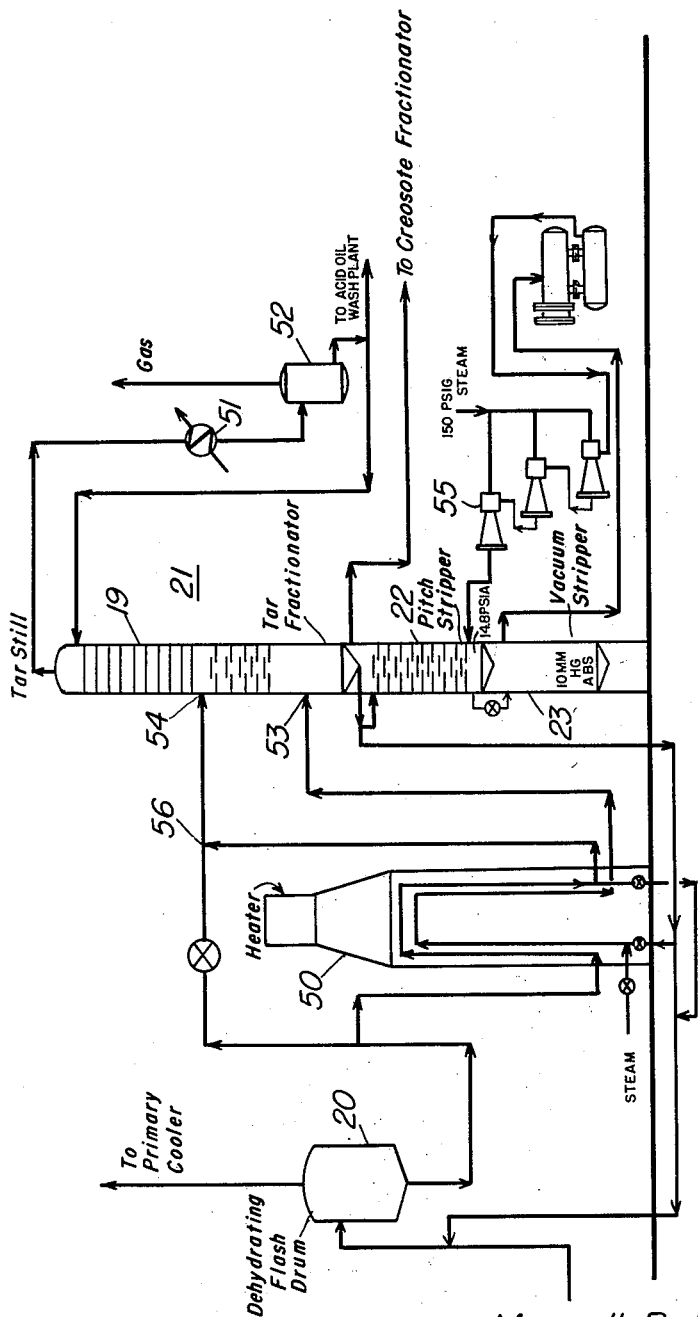

2,795,534

TAR DISTILLATION PROCESS

Maxwell P. Sweeney, Glenolden, Pa., assignor to United Engineers & Constructors Inc., Philadelphia, Pa., a corporation of Delaware Application May 12, 1953, Serial No. 354,542

14 Claims. (Cl. 196—76)

This invention relates to an improved distillation method for the processing of multi-component systems and has particular application in the recovery of by-products from hot coke oven gases.

In many industries the problem arises of separating by distillation an intermediate component from a mixture of that component and higher and lower-boiling materials. In many instances, such problems have been met by charging the mixture to a fractionation column, removing a side stream rich in the intermediate component from the column, and, if desired, subsequently redistilling the side stream to the desired degree of purity. In processes of this nature, the highest temperature used in the column must be somewhat greater than that necessary to boil off all the intermediate component. The quantity of heat supplied at this level, however, is often determined not only by the quantity of material removed in the side stream, but by the total throughput of the column. In many cases such procedure is expensive in that relatively large quantities of heat at a high temperature level are required. The amount of heat required is further increased because the large throughput requires a large diameter column, resulting in increased sensible heat losses. Moreover, large diameter columns with their heaters and auxiliaries are expensive to build and maintain. In addition, when heat-sensitive materials are present, high temperature distillation may result in undesirable polymerization or decomposition.

One industry in which this problem has been encountered is in the recovery of by-products from hot coke oven gases.

In the production of coke, natural carbonaceous materials such as coal, lignite, peat or the like are heated in the absence of air with the production of certain gaseous products. Among these are tars, hydrocarbons such as benzene, naphthalene, various lower paraffins, olefins, nitrogenous compounds such as ammonia and hydrogen cyanide as well as hydrogen and oxides of carbon.

The recovery of many of these materials, particularly the valuable aromatic compounds, is economically desirable and, over the years, many processes have been suggested whereby the efficient recovery of coke oven by-products can be accomplished. One such process is that described and claimed in the copending application of Gerald L. Eaton, Serial No. 161,325, filed May 11, 1950, now Patent No. 2,649,403.

In the method according to the above copending application, hot coke oven gases as they come from the ovens are first contacted in conventional manner with an aqueous liquor, with resultant cooling and removal of a major portion of the tar. The cooled gases are scrubbed with an absorber oil to remove naphthalene with consequent enrichment of the absorber oil. The naphthalene-rich absorber oil is then co-fractionated with a heavy carrier to separate the naphthalene from the absorber oil and recover both valuable substances. A "heavy carrier" is defined as a hydrocarbon material having a boiling point above the end point of the absorber oil, which will remain liquid when the absorber oil is vaporized. The heavy carrier referred to in the above copending patent is preferably the tar previously removed from the gases.

In the process described in the above copending patent, the co-fractionation of the tar and naphthalene-rich absorber oil is carried out by a process in which a large percentage of the tar and material from the naphthalene scrubbers is vaporized in a single distillation column.

As pointed out, one purpose for which the tar is added in the process according to the above copending patent, is to act as a "heavy carrier" which will remain liquid when the absorber oil is vaporized and thus prevent coke formation in the fractionation column. However, only about 2 percent on the weight of the distilland is necessary for this purpose. A greater portion of tar is generally used because it is desired to recover the absorber oil and other valuable lower-boiling products present in the tar. For some types of tar this is an economical procedure. Where the tar, however, contains only a small amount of absorber oil, the temperature level at which heat is supplied to the whole still is determined by a minor (quantitatively speaking) component. The problem is complicated further where the boiling-point range of the absorber oil is narrow, and where the limits of that range must be strictly adhered to lest undesirable components be included. An example of such undesirable component is acenaphthene, which, if present in the absorber oil, will tend to crystallize and block the scrubbers and other apparatus.

It is therefore an object of the present invention to provide a distillation procedure of improved economy by which an intermediate component may be separated from a mixture of higher and lower-boiling materials.

It is a further object of the invention to provide a more efficient coke oven by-product recovery system than has hitherto been available.

It is another object of the invention to provide a process of improved economy and efficiency for recovering and regenerating absorber oil in a coke oven by-product recovery system.

It is another object of the invention to provide an improved distillation method for processing coke oven tar.

According to the invention, these and other objects are achieved by first making a "rough split" of the mixture containing an intermediate component which it is desired to recover, so that some of that intermediate component and all lower-boiling materials are in a first portion and the balance of the intermediate component and all higher-boiling materials are in a second portion. These two portions are each further distilled for recovery of the intermediate component, the heat required for distillation of the first portion being transferred at a relatively low level and the high temperature distillation of the second portion requiring only an amount of heat based on that necessary to boil overhead the amount of intermediate component present.

According to a specific embodiment of the invention wherein coke oven tar is the mixture and absorber oil is the intermediate component, the mixture is divided into a first portion containing some absorber oil and lower-boiling components and a second portion containing some absorber oil and higher-boiling components. The first portion may then be fractionated using steam as a heating medium to leave the absorber oil as a liquid bottoms stream. The second portion may be steam stripped to remove a stream containing the absorber oil and a higher-boiling creosote oil and this stream may then be distilled to remove the absorber oil overhead.

Similarly, in a coke oven by-product recovery process such as described in the copending patent referred to above, where naphthalene is scrubbed from the gas with a carefully fractionated absorbed oil, the rich absorber oil can first be split into a low-boiling portion containing some absorber oil, and all lower-boiling materials, and a second portion containing the remaining absorber oil and whatever higher-boiling materials may have been picked up in the naphthalene scrubber. The higher-boiling portion is then preferably co-fractionated with a portion of the tar containing absorber oil and higher-boiling materials. The lower-boiling materials may be fractionated at a lower temperature level.

The term "absorber oil" is used herein to mean a coal tar oil having an initial point not lower than about 225° C. and an end point not higher than about 335° C. (atmospheric distillation) for example, having a boiling-point range of between about 225° C. and about 275° C., and which will remove naphthalene from the coke oven gases.

In making the rough split or division, various techniques may be employed. In many cases a flash distillation is carried out, but it will be obvious that a conventional "slow" distillation may be used or any other process which will yield a division of the material to be treated into a high- and a low-boiling portion.

In the drawings:

Fig. 2 is a flow sheet illustrating in more detail the tar distillation procedure shown also in Fig. 1.

Figure 1:
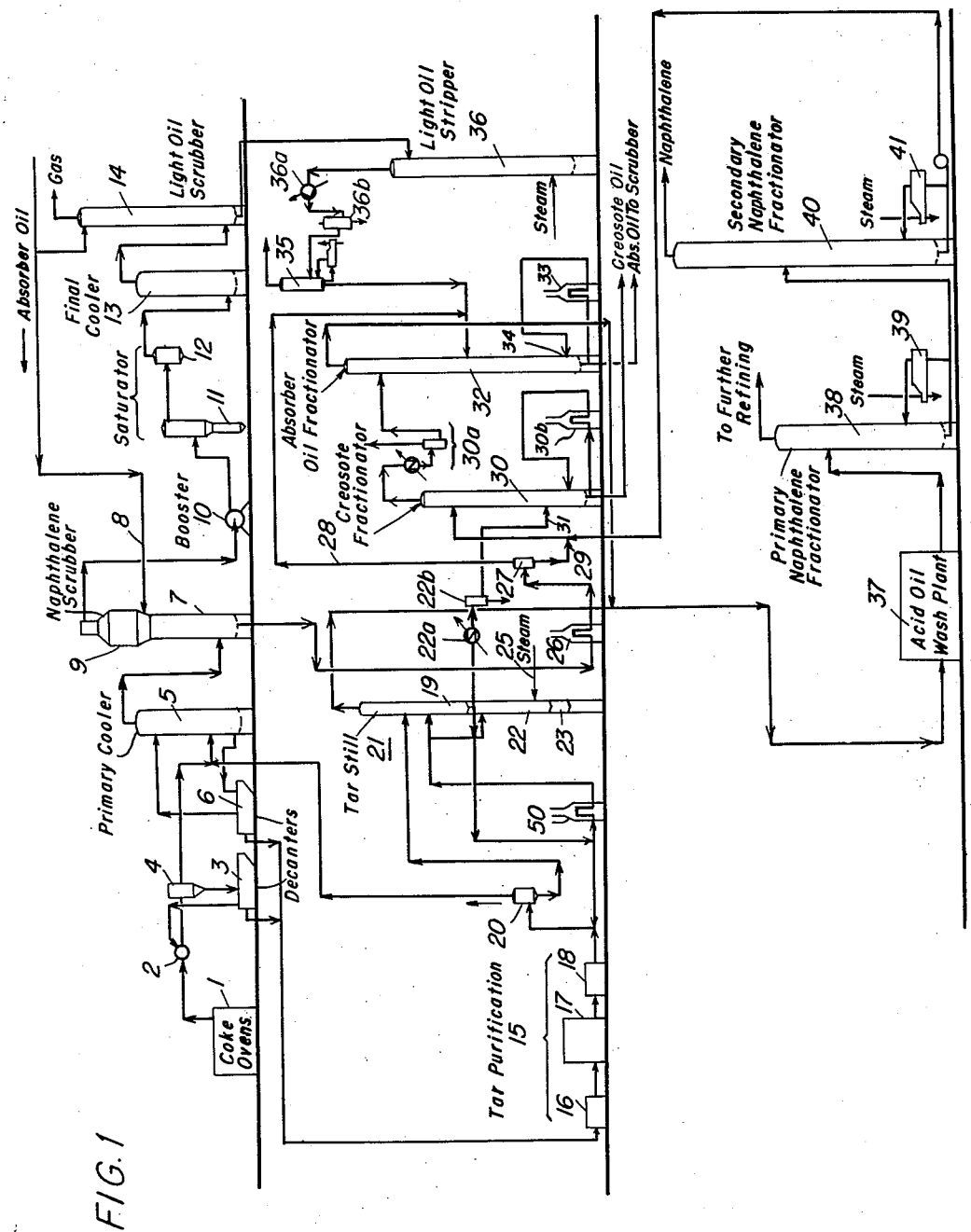
Fig. 1 is a flow sheet showing a coke oven by-product recovery process embodying the invention.

Referring to Fig. 1, coal is distilled in ovens 1 to produce coke and also the hot gases which contain the by-products it is desired to recover. The gases at a temperature above about 800° C. are led from the ovens to a main 2 where they are contacted with an aqueous flushing liquor drawn from a flushing liquor decanter 3. In this way, the gases are cooled to between about 60° C. and about 100° C. and a portion of their tar and ammonia content is removed. The foul liquor from the mains is removed from the gas stream in downcomer 4.

The gases leaving the downcomer are then passed through a primary cooler 5 where they are again contacted with an aqueous liquor, drawn in this case from a circulating liquor decanter 6. In the primary cooler the temperature of the gases is further reduced to between about 20° C. and about 40° C., and additional tar and ammonia are absorbed. The foul circulating liquor from the primary coolers is returned to the circulating liquor decanter.

From primary cooler 5, the gases are conducted to naphthalene scrubber 7, where they are contacted with absorber oil, entering through line 8.

In the naphthalene scrubber 7 a major portion of the naphthalene in the gases is removed, together with a substantial portion of the heavier homologues of the light oils, this proportion increasing with the molecular weight of the homologue.

The gas passing out of the top of naphthalene scrubber 7 is at a temperature between about 20° C., and about 40° C. It may contain from about 1 to about 25 grains of naphthalene per hundred cubic feet at standard conditions, depending on the purity of the fresh absorber oil with respect to naphthalene contamination. As it leaves the naphthalene scrubber, it is run through precipitator 9 where solid particles of coke which may have been carried over from the ovens, and small drops of tar present as "fog," are removed.

From the precipitator 9, the gases are delivered to a booster 10 where their pressure is raised, to a degree dependent on the demand requirements and on the pressure drop of downstream apparatus, but preferably to above about 4 p. s. i. g.

From the booster the gas may be sent to an ammonia saturator 11, where ammonia is removed, and thence to an acid catcher 12, for the removal of acid which may have been picked up in the saturator.

From the acid catcher the gases move to a final cooler 13 where they are contacted with water to bring their temperature down to between about 20° C. and about 40° C. At this temperature and at a pressure which is preferably above about 3 p. s. i. g., the gases are contacted in light oil scrubber 14 with additional absorber oil, in this case for the removal of light oils. From light oil scrubber 14 the gases emerge clean and dry, ready to be passed directly to fuel mains and burners.

Returning now to the flushing and circulating liquor decanters 3 and 6, the foul liquors from the collecting main and primary cooler, upon standing, separate into tar layers and water layers. The water layer from the flushing liquor decanter is re-used in the collecting mains, and that from the circulating liquor decanter is re-used in the primary cooler. The tar layers from both decanters may be combined and charged to a purification plant indicated generally as 15.

The purification plant may comprise a "wet" storage tank 16, a centrifuge 17, and a "dry" storage tank 18. In the centrifuge 17, the major portion of the water is removed, leaving from about 0.1% to about 2% in the tar.

The process steps described above are set forth in somewhat greater detail in copending Patent No. 2,649,403, which may also be referred to for further details of construction and operation of primary cooler 5 and naphthalene scrubber 7.

It is observed that the procedure so far described results in the production among other materials of a crude tar containing between about 0.1% and about 2% water and a naphthalene-rich absorber oil issuing from the bottom of the naphthalene scrubber.

According to the invention, the semi-dry tar from tank 18 is mixed with hot bottoms from tar fractionator 19. By this means its temperature is rapidly raised to between about 100° C. and about 250° C., say to about 120° C., which is above the temperature at which the remaining water is vaporized from the tar. The hot stream is then charged to a tar dehydrating flash drum 20 where the water, already converted to steam, is flashed overhead. The dehydrated tar from drum 20 is then charged to a tar fractionator 19.

As will be seen more clearly from Fig. 2, tar fractionator 19 is a part of tar still 21, the other sections being pitch stripper 22 and vacuum stripper 23.

As shown in Fig. 2, between about 10% and about 100%, usually about 75% of the crude tar from flash drum 20, is sent through heater 50, before charging to tar fractionator 19. In the heater 50, the temperature of the crude tar is raised to between about 175° C. and about 300° C., usually to about 256° C. This hot portion then rejoins the main stream coming directly from the flash drum as at 56. The effect of this preliminary heating is usually to vaporize some of the lighter components in the crude tar so that the stream actually entering the fractionator 19 is a mixture of liquid and vapor. This permits the size of the bottom portion of the fractionator 19 to be reduced.

In fractionator 19, between about 10% and about 80%, usually about 50%, of the absorber oil present in the tar, together with nearly all material boiling below absorber oil, e. g., tar acids, naphthalene, and light oils, are vaporized and taken off overhead. A certain amount of the overhead, after being condensed in condenser 51 and separated in drum 52, is returned to the tar fractionator as reflux. The remainder of the overhead is charged to the acid oil wash plant 37 (Fig. 1) for recovery of tar acid and other compounds.

A few trays are preferably provided in fractionator 19 below the feed point 54 to keep naphthalene out of the bottoms going to the pitch stripper 22.

The bottoms stream from tar fractionator 19 comprises between about 20% and about 90%, usually about 50% of the absorber oil, and a creosote oil boiling between about 250° C. and about 350° C., and pitch. It is divided into three parts.

One part is charged directly to pitch stripper 22. A second part is heated in heater 50 and recycled to fractionator 19 entering at 53, to provide the necessary heat for the fractionation.

A third part mixed, if desired, with heated crude tar from flash drum 20 via heater 50, is combined with the feed to flash drum 20 to effect vaporization of the water therein as outlined above.

That part of the bottoms charged to pitch stripper 22 is contacted therein with steam, to carry overhead absorber oil and the higher-boiling creosote oil, leaving a bottoms of soft pitch. As shown in Fig. 2, if desired, this pitch can be further stripped to produce a hard pitch in vacuum stripper 23 under a pressure of between about 5 and about 100, say about 10 mm. Hg absolute. A multi-stage steam jet ejector 55 is used to maintain the vacuum in stripper 23, the exhaust steam from the ejector being utilized for stripping in pitch stripper 22.

The tar still system described above has a number of unique and advantageous features. Thus, it permits the use of a maximum temperature of between about 350 and about 400° C. With temperatures kept down at this level, polymerization and coking of polymerizable and heat-sensitive materials in any part of the system, are suppressed. At the same time, by splitting off the lower-boiling materials at a point in the absorber oil range, the total volume of materials sent through stripper 22 is reduced, keeping steam consumption down.

Moreover, by splitting the charge in the absorber oil range, the closely controlled separation of lower-boiling materials from the absorber oil can be made at a relatively low temperature level, as will appear below. At the same time, the quantity of heat transferred at a high level to separate the absorber oil from higher-boiling materials is minimized.

Finally, the described system of tar distillation is inherently flexible, in that no attempt is made to make a sharp division between various components. Thus, unlike processes in which various side cuts of different compositions are taken, the present system is easily adapted to handle tars of different compositions, with a minimum of heat consumption.

Turning now to the naphthalene-rich absorber oil from scrubber 7, this contains from about 3% to about 15% naphthalene, generally about 8%, a certain amount of light oils, some materials boiling above the absorber oil, and a small amount of solid particles such as coke and ash carried over from the ovens.

According to the invention, this naphthalene-rich absorber oil is sent through heater 26 where its temperature is raised to between about 200° C. and about 300° C., preferably about 270° C. It is then charged to absorption oil flash drum 27. In the drum 27, from about 20% to about 90%, preferably about 80% of the absorber oil and substantially all the materials boiling below the absorber oil including naphthalene and whatever light oils may have been picked up in the naphthalene scrubber are vaporized and pass out of the drum through line 28. From about 10% to about 80%, preferably about 20% of the absorber oil and substantially all of the materials boiling above the absorber oil are retained in the liquid state and are drawn from the flash drum through line 29.

Line 29 delivers the liquid bottoms stream from drum 27 to a tray toward the top of a creosote fractionator 30. At the same time, the overhead from pitch stripper 22, condensed at 22a, and water having been separated at 22b, is charged to a lower point 31 on the creosote fractionator.

A further charge to the fractionator 30 may be the bottoms stream from secondary naphthalene fractionator 40, which contains the absorber oil taken overhead from tar fractionator 19 as will be seen below.

In the creosote fractionator 30, the two charged streams are co-fractionated to give an overhead containing absorber oil and any lower-boiling materials still present, and a bottoms stream containing principally creosote oil, higher-boiling materials, and such solid particles as may be present. In the creosote fractionator, the creosote oil acts as a heavy carrier preventing high-boiling polymerizable materials from the naphthalene-rich absorber oil from coking in the trays of the fractionator. Such materials are carried off in the bottoms stream by the cresote oil. A portion of this bottoms stream is sent through heater 30b, and returned to the fractionator 30 to supply the heat necessary for fractionation.

The overhead from creosote fractionator 30 is condensed at 30a, and delivered to absorber oil fractionator 32. The overhead vapor stream from absorber oil flash drum 27 is also charged to absorber oil fractionator 32, at a point below the charging point of the feed from the creosote fractionator. In the absorber oil fractionator 32, naphthalene and lower-boiling materials are vaporized and pass overhead and a pure absorber oil is taken off in the bottoms stream. A part of the bottoms is sent through heater 33 and returned to the absorber oil fractionator as at 34 to supply the necessary heat for fractionation.

The overhead from fractionator 32 may be combined with the overhead from tar fractionator 19 and charged to acid oil wash plant 37, as noted above, for removal of tar acid and other compounds. The output stream from the acid oil wash plant is then charged to primary naphthalene fractionator 38 where materials boiling below naphthalene are taken off overhead and may be further refined. The heat necessary for this operation may be furnished through reboiler 39 using steam as the heating medium.

The naphthalene-rich bottoms from fractionator 38 are charged to a secondary naphthalene fractionator 40 where naphthalene is taken overhead, leaving a contaminated absorber oil as the bottoms stream. As noted above, this bottoms stream may be combined with the charge to creosote fractionator 30.

Heat for the operation of secondary naphthalene fractionator 40 may be furnished by steam in reboiler 41.

Turning now to the light-oil-rich absorber oil from scrubber 14, it is first steam stripped as shown in Fig. 1, in stripper 36 to achieve the bulk of the separation between light oil and absorber oil. The light oil, after condensation and removal of water, at 36a and 36b, respectively, still contains a certain amount of absorber oil. It is preferably charged to light oil tower 35 where the light oil is removed overhead and may be further distilled. Preferably, the bottoms stream containing absorber oil and a certain amount of tar acids and naphthalene, is then charged to the absorber oil fractionator 32 where the materials boiling below absorber oil join the overhead stream and the absorber oil is taken off with the absorber oil from other sources in the bottoms stream.

Although the invention has been described above in connection with a coke oven by-product recovery process, it will be understood that it may be employed in various other situations where it is desired to recover by distillation, an intermediate component from a mixture containing higher and lower-boiling materials. By permitting lower-boiling materials to be removed through heat furnished at a relatively low temperature level, the process, according to the invention, provides improved economy in that it allows use to be made of low temperature heat sources which could not otherwise be employed, and in that the heat furnished at higher temperature levels is limited to that necessary to vaporize only a part of the intermediate compound. By reducing the throughput of high temperature distillation columns, the size of such columns may be reduced, thus reducing both initial cost and costs incurred by sensible heat losses from such columns. Moreover, with the present process, heat-sensitive materials may be economically handled at temperatures such that they are not destroyed or polymerized.

Specifically, with regard to coke oven by-product recovery, the present invention provides a process of improved economy in which a continuously regenerated absorber oil of highly defined boiling-point range may be produced and utilized.

The present process is particularly useful where the absorber oil content of the tar is low, because it confines the volume of material handled in the distillation apparatus to that necessary to give the required boiling-point definition.

The invention, moreover, provides an improved means of coke oven tar recovery with the advantages outlined above. In particular, with the present process, high temperatures which would adversely affect heat-sensitve portions of the tar may be avoided.

A further feature of the invention as applied to coke oven by-product recovery is that by providing for the economic extraction and continuous regeneration of an absorber oil having a closely controlled boiling-point range, the removal of very nearly 100% of the naphthalene present in the gases is made possible. This is advantageous not only for the value of the naphthalene, but because even a moderate amount of naphthalene if left in the fuel gases, will crystallize and clog up downstream equipment, such as pumps, valves and burners. The highly purified absorber oil also makes possible a more complete recovery of valuable light oils.

Moreover, as a practical matter, the economy of the process is enhanced by the fact that in those places where polymerizable materials are present, e. g., in the creosote fractionator, a heavy carrier is also present, thus preventing tars and gums from coking up on the still trays.

It will be understood that the process shown in the drawings and the figures given in connection therewith are for purposes of illustration and are not to be construed as limiting the invention.

What is claimed is:

1. A distillation process for the purification of coke oven tar which comprises heating crude tar to partially vaporize said crude tar, charging said partially vaporized tar to a first distillation stage, removing absorber oil and lower-boiling components from said first stage as an overhead vapor stream, removing absorber oil and higher-boiling components from said first stage as a liquid bottoms stream, and charging the bottoms stream from said first stage to a second stage in which said bottoms stream is steam stripped to remove absorber oil, whereby polymerization of polymerizable materials in the tar is avoided and steam consumption is minimized.

2. A distillation process for the purification of crude coke oven tar which comprises dehydrating said crude tar, charging the dehydrated tar to a first distillation stage, removing absorber oil and lower boiling components from said first stage as an overhead vapor stream, removing absorber oil and higher boiling components from said first stage as a liquid bottoms stream, bringing at least a part of said liquid bottoms stream into heat exchange relationship with said crude tar to effect the dehydration of said crude tar and charging at least a portion of the bottoms stream from said first stage to a second distillation stage in which said bottoms stream is steam stripped to remove absorber oil therefrom, whereby polymerization of polymerizable material in the tar is avoided and steam consumption is minimized.

3. A distillation process as claimed in claim 2, in which said dehydration is carried out by mixing the hot bottoms from said first stage with said crude, tar, whereby the water present in said crude tar is flashed overhead.

4. A distillation process for the purification of coke oven tar which comprises a first distillation stage in which crude tar is distilled to give absorber oil and lower-boiling components as an overhead stream, and absorber oil and higher boiling components as a bottoms stream, a second stage in which the bottoms from said first stage are steam stripped to remove a stream containing absorber oil and a creosote oil having a higher boiling-point range than said absorber oil, and a third stage in which said stream from said second stage is distilled to separate said absorber oil from said creosote oil, whereby polymerization of polymerizable materials is avoided and high level heat transfer is minimized.

5. A distillation process for the purification of coke oven tar, which comprises charging crude tar to a first distillation stage, removing absorber oil and lower boiling components from said first stage as an overhead vapor stream, removing absorber oil and higher boiling components from said first stage as a liquid bottoms stream, charging said overhead stream to a second distillation stage for the recovery of absorber oil therefrom, and charging said bottoms stream to a third distillation stage and in said third stage, steam-stripping said bottoms stream to remove absorber oil therefrom, whereby polymerization of polymerizable materials in the tar is avoided and steam consumption is minimized.

6. The process claimed in claim 5 and comprising dehydrating the crude tar before it is charged to the first distillation stage.

7. In a coke oven by-product recovery process wherein the hot coke oven gases are treated for the removal of tar therefrom, and are subsequently scrubbed with an absorber oil for the removal of naphthalene therefrom with consequent production of a naphthalene-rich absorber oil, the steps of separating said naphthalene-rich absorber oil into a low-boiling vapor portion comprising some of said absorber oil and materials boiling below said absorber oil, and a high-boiling liquid portion comprising some of said absorber oil and materials boiling higher than said absorber oil, distilling said tar to obtain a fraction comprising absorber oil and higher-boiling materials and co-fractionating said tar fraction with the higher-boiling portion of said naphthalene-rich absorber oil to produce a vapor stream containing said absorber oil and lower-boiling materials and a bottoms stream containing material boiling above said absorber oil, whereby the quantity of heat transferred at high temperature levels is minimized.

8. In a method as claimed in claim 7, the additional steps of co-fractionating the vapor stream from said co-fractionation and the lower-boiling portion of said naphthalene-rich absorber oil to form an overhead stream of naphthalene and materials boiling below naphthalene and a bottoms stream containing substantially pure absorber oil.

9. A process as claimed in claim 7, wherein the separation of said naphthalene-rich absorber oil into a low-boiling and a high-boiling portion is accomplished by flash distilling said naphthalene-rich absorber oil to obtain a vapor stream comprising some of said absorber oil and lower-boiling materials, and a liquid stream comprising some of said absorber oil and higher-boiling materials.

10. A process as claimed in claim 7, wherein about 80% of the absorber oil present in said naphthalene-rich absorber oil is in said low-boiling portion and about 20% is in said high-boiling portion.

11. In a coke oven by-product recovery process, wherein the hot coke oven gases are treated for the removal of tar therefrom, are then scrubbed with an absorber oil for the removal of naphthalene therefrom with consequent production of a naphthalene-rich absorber oil, and are subsequently scrubbed with additional absorber oil for the removal of light oils therefrom, with consequent production of a light oil-rich-absorber oil, the steps of separating said naphthalene-rich absorber oil into a low-boiling vapor portion comprising some of said absorber oil and materials boiling below said absorber oil, and a higher-boiling liquid portion comprising some of said absorber oil and materials boiling above said absorber oil, distilling said tar to obtain a fraction comprising absorber oil and higher-boiling materials, co-fractionating said tar fraction with the higher-boiling portion of said naphthalene-rich absorber oil to produce an overhead stream containing absorber oil and lower-boiling materials, and a bottoms stream containing material boiling above said absorber oil, distilling said light-oil-rich absorber oil to produce a light oil stream and a higher-boiling stream containing absorber oil, and co-fractionating said higher-boiling stream with the overhead stream from said first co-fractionation step, whereby the purity of said absorber oil is maintained and heat transfer at high temperature levels is minimized.

12. In a coke oven by-product recovery process wherein hot coke oven gases are treated for the removal of tar therefrom, and are subsequently scrubbed with absorber oil for the removal of naphthalene therefrom with consequent production of a naphthalene-rich absorber oil, the steps of separating said tar in a first distillation stage into a first vapor portion comprising absorber oil and lower-boiling materials and a second liquid portion containing absorber oil and higher-boiling materials, stripping said second portion to produce a stream containing absorber oil and a creosote oil boiling above said absorber oil, subjecting said first portion to a second distillation stage wherein materials boiling below absorber oil are removed overhead leaving a bottoms stream of contaminated absorber oil; splitting said naphthalene-rich absorber oil into a low-boiling portion containing absorber oil and materials boiling below absorber oil and a high-boiling portion containing absorber oil and higher-boiling materials; and in a third stage co-fractionating said stripped stream containing absorber oil and a creosote oil, said bottoms stream containing contaminated absorber oil from said second distillation stage and said high-boiling portion from said naphthalene-rich absorber oil to produce an overhead stream rich in absorber oil and a bottoms stream of higher-boiling materials, whereby a high quality absorber oil may be produced and regenerated with a minimum expenditure of high temperature heat.

13. A process as claimed in claim 12 and including a fourth stage wherein the overhead from said third stage is fractionated to produce an overhead comprising naphthalene and lower-boiling materials and a bottoms stream of pure absorber oil.

14. A process as claimed in claim 13 wherein the overhead from said fourth stage is charged to said second stage.

References Cited in the file of this patent

UNITED STATES PATENTS

| | | |
|---|---|---|
| 1,993,344 | Jacobson | Mar. 5, 1935 |
| 2,570,607 | Smith | Oct. 9, 1951 |
| 2,607,719 | Elliott et al. | Aug. 19, 1952 |
| 2,649,403 | Eaton | Aug. 18, 1953 |
| 2,649,404 | Reynolds | Aug. 18, 1953 |
| 2,649,405 | Eaton | Aug. 18, 1953 |
| 2,697,067 | Reynolds | Dec. 14, 1954 |